United States Patent
Hurich et al.

(10) Patent No.: US 7,016,769 B2
(45) Date of Patent: Mar. 21, 2006

(54) CONTROL DEVICE FOR CONTROLLING/REGULATING THE OPERATIONAL SEQUENCES IN A MOTOR VEHICLE, AND A METHOD OF STARTING SUCH A CONTROL DEVICE

(75) Inventors: Martin Hurich, Ihrlerstein (DE); Wolfgang Grimm, Offenau (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 10/381,175

(22) PCT Filed: Sep. 11, 2001

(86) PCT No.: PCT/DE01/03475

§ 371 (c)(1),
(2), (4) Date: Sep. 25, 2003

(87) PCT Pub. No.: WO02/25434

PCT Pub. Date: Mar. 28, 2002

(65) Prior Publication Data

US 2004/0039491 A1 Feb. 26, 2004

(30) Foreign Application Priority Data

Sep. 20, 2000 (DE) ................ 100 46 620

(51) Int. Cl.
*G06F 17/00* (2006.01)
*G06F 9/44* (2006.01)

(52) U.S. Cl. ............... 701/1; 701/29; 701/35; 713/501; 713/503; 713/400; 713/601

(58) Field of Classification Search ............ 701/1, 701/29, 31, 34, 35; 713/400–601, 322, 36, 713/731; 702/186; 712/32, 37, 40; 717/121, 717/122, 1; 709/248; 714/36, 731
See application file for complete search history.

(56) References Cited

U.S. PATENT DOCUMENTS

| | | | | | |
|---|---|---|---|---|---|
| 4,095,267 | A | * | 6/1978 | Morimoto | 713/501 |
| 5,125,088 | A | * | 6/1992 | Culley | 713/400 |
| 5,241,681 | A | | 8/1993 | Hamid et al. | 712/38 |
| 5,301,306 | A | * | 4/1994 | Plog | 713/501 |
| 5,600,792 | A | * | 2/1997 | Pockrandt et al. | 714/47 |
| 5,623,647 | A | | 4/1997 | Maitra | 713/501 |
| 5,845,111 | A | * | 12/1998 | Lin et al. | 713/501 |
| 5,872,994 | A | * | 2/1999 | Akiyama et al. | 712/43 |
| 6,076,171 | A | * | 6/2000 | Kawata | 713/501 |
| 6,084,441 | A | * | 7/2000 | Kawai | 327/99 |
| 6,341,239 | B1 | * | 1/2002 | Hayashi et al. | 700/79 |

FOREIGN PATENT DOCUMENTS

| | | |
|---|---|---|
| EP | 0 707 271 | 4/1996 |
| EP | 1 001 391 | 5/2000 |

* cited by examiner

Primary Examiner—Tan Q. Nguyen
(74) Attorney, Agent, or Firm—Kenyon & Kenyon

(57) ABSTRACT

A control device and a method for controlling and/or regulating the operational sequences in a motor vehicle, and a method for starting such a control device, which provide a program in a storage medium of the control device that is able to be executed independently of the frequency of the CPU, which allows the pulse frequency of the CPU to be checked and employs measures for reprogramming the program to be initiated. During starting or operation of the control device, the frequency of the CPU is checked first or the frequency of the CPU is compared to the frequency expected in the program. If necessary, measures for reprogramming the program are subsequently initiated.

20 Claims, 1 Drawing Sheet

CONTROL DEVICE FOR CONTROLLING/REGULATING THE OPERATIONAL SEQUENCES IN A MOTOR VEHICLE, AND A METHOD OF STARTING SUCH A CONTROL DEVICE

FIELD OF THE INVENTION

The present invention is directed to a control device for controlling and/or regulating the operational sequences in a motor vehicle, a corresponding method, and a method of starting such a control device.

BACKGROUND INFORMATION

The functional sequences of control devices, used to control and/or regulate the operational sequences in a motor vehicle, are controlled from an input program using associated data which are input by the customer or the manufacturer of the control device. In its execution, this program is dependent upon the frequency of the CPU of the control device. A common source of error is the implementation of a program that is not set up for the frequency of the CPU. Such a program is unable to run and may also no longer be reprogrammed since the routines for establishing the communication must be located in the frequency-dependent part of the software, thus making communication to the outside impossible. In such a case, the control-device program is no longer accessible from the outside and the control device may need to be returned to the manufacturer. For safety reasons, the execution of an incorrectly programmed program upon start-up of the vehicle should be prevented.

Therefore, there is a need to develop a control device and a method which prevents the execution of an incorrectly programmed program and allows a correction of the faulty program and the starting of such a control device.

SUMMARY OF THE INVENTION

According to the present invention, a control device and a method of controlling and/or regulating the operational sequences in a motor vehicle having a CPU with a predefined pulse frequency and a storage medium is provided. The storage medium includes a frequency-dependent program, whereby the program is executable as a function of the pulse frequency of the CPU. The control device according to the present invention is distinguished in that the storage medium is additionally provided with a frequency-independent program, which allows a check of the pulse frequency of the CPU and is able to initiate measures to reprogram the program accordingly.

Furthermore, the present invention provides a computer program on a storage medium which, upon execution on a computer or a control device, executes a method of controlling and/or regulating operational sequences according to the present invention or a method of starting a control device according to the present invention. The computer programs may either be executed on a control device according to the present invention or on an external programming device.

These measures are intended to ensure that an outbound communication is possible even when a program has been programmed incorrectly. Prior to executing the frequency-dependent program, the frequency-independent program checks whether its execution is possible, i.e., whether the expected frequency of the CPU matches the frequency provided for in the program. If this is the case, the execution of the program continues. Otherwise, the frequency-independent program initiates a measure to reprogram the incorrectly programmed program.

In this way, it is ensured that an incorrectly programmed program will not be executed and that the program is able to be corrected.

The storage medium may be, for instance, a hard disk, an EPROM, a flash-EPROM etc., but also a mobile storage medium such as a diskette or a CD-ROM.

Data relating to the pulse frequency of the CPU may be stored in a nonvolatile memory, especially an EPROM or ROM, or may be detected by this nonvolatile memory and read out from it for checking. This may involve the storage medium and also an additional storage means.

In the method according to the present invention of starting a control device, the pulse frequency of the CPU is first determined using a routine in the frequency-independent program and/or is read out from the nonvolatile memory. On the basis of the ascertained pulse frequency, it is checked whether the program has been programmed correctly. If the program has been programmed incorrectly, measures are initiated to reprogram it. In the case of a correctly programmed program, or following its reprogramming, the execution begins.

The method may be carried out prior to the first starting of the control device. However, it may also be reexecuted upon every start.

It is believed that it is advantageous if data relating to the pulse frequency of the CPU is stored in a non-erasable memory, such as a ROM. The routine for determining the pulse frequency reads in this data via a first interface between the program and ROM.

Following a check of the determined pulse frequency, the routine may output a Boolean value which indicates whether or not the program has been programmed correctly. The Boolean value is forwarded to the program via a second interface.

The routine for determining the CPU frequency has two interfaces. One of these is the interface with the ROM via which the data relating to the actual frequency of the utilized CPU is collected. The second interface represents the connection to the program to which the expected CPU frequency pulse stipulated in the program and also the result of the comparison, i.e., the Boolean value, are forwarded. The Boolean value is TRUE if the determined CPU frequency corresponds to the expected pulse frequency, i.e., the program frequency. Otherwise, the value is FALSE.

In this context, a tolerance range may advantageously be provided. Slight deviations between the expected pulse frequency, which is able to be determined from the frequency-dependent program, and the pulse frequency of the CPU, that is, deviations within a predefinable tolerance range that will not limit the performance reliability, may be allowed. Within the tolerance range for a frequency deviation, it is thus also possible that TRUE may expediently be output when using Boolean values.

The code of the routine is advantageously located in the same region as the initialization routines of the control program. In this way it is possible to ensure that the code is available when the initialization routines are executed. If possible, the routine is called at the beginning of the initialization. The further execution of the initialization is allowed if the diagnostics routine has returned the value TRUE. The reason for this early execution is that otherwise it may happen that registers have already been reconfigured in accordance with the program defaults, thereby interrupting the execution of the frequency-independent program.

Consequently, there is also no reason to continue processing configuration data before exiting an incorrect program, or, in the case of a correct program, to execute such operations before checking the CPU frequency.

DETAILED DESCRIPTION

Control device 1 includes a CPU 2, a ROM 3, a storage medium 4 and an input/output unit 5. The various components are interconnected by a data bus 6. Storage medium 4 may be subdivided into two parts, namely a frequency-dependent part and a frequency-independent part.

Figure 1:
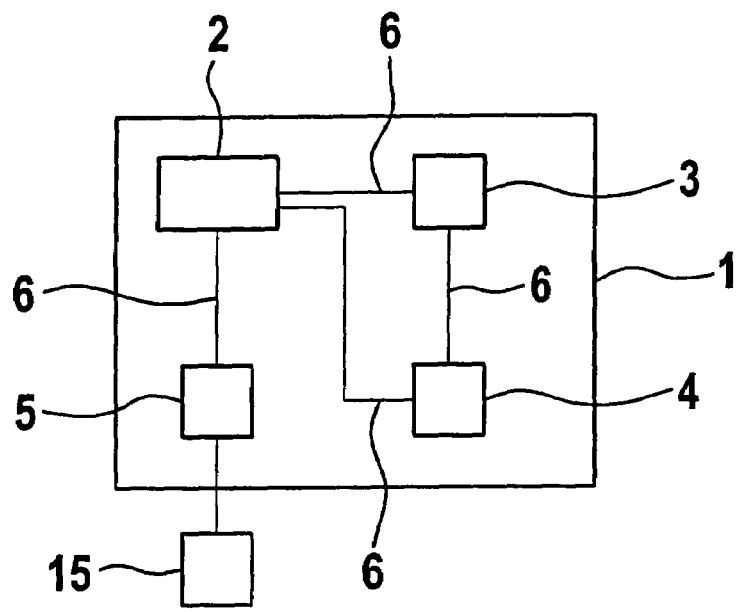
FIG. 1 shows an exemplary control device according to the present invention with a programming device in a schematic representation.

Storage medium 4 includes the frequency-dependent program as well as the frequency-independent program which is able to run independently of the pulse frequency of CPU 2 and checks the pulse frequency of CPU 2 prior to executing the program and, if necessary, initiates measures to reprogram the program. The data relating to the pulse frequency of CPU 2 is provided by ROM 3, for instance. Via input-output unit 5, which is of serial or parallel type, for example, control device 1 communicates with a control device or programming device 15 (represented purely schematically in FIG. 1), and an arrangement for assuring communication between control device 1 and control device or programming device 15, which is not shown in detail. This external programming device 15, which may also be a common personal computer, is used to input programs and/or data, such as a new program version and/or data version. Additional media and/or devices may also be used as the external programming device. The control device 1 shown is used to control operating sequences, especially in a motor vehicle, for example, for a transmission control system, an engine control system, a brake control system (ABS, ASR, ESP etc.), a steering control system, a vehicle movement control and/or an adaptive cruise control (ACC) etc.

Figure 2:
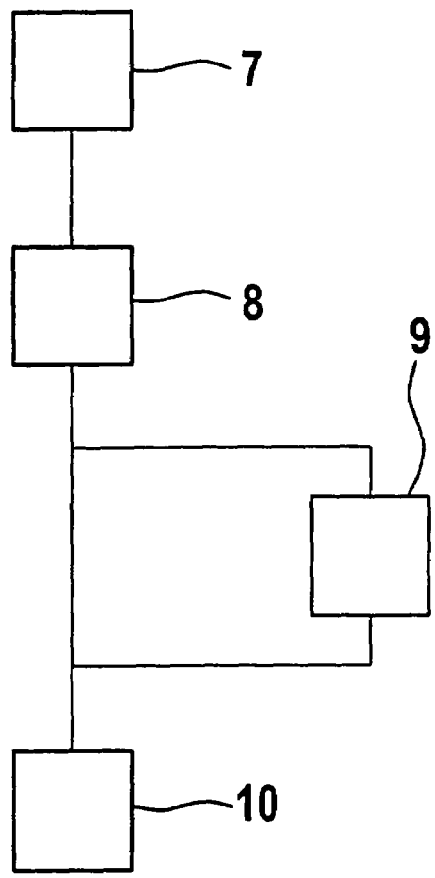
FIG. 2 shows an exemplary sequence of the method according to the present invention.

FIG. 2 shows an exemplary sequence of the method according to the present invention.

In a step 7 in FIG. 2, control device 1 (FIG. 1) is started up. Directly at the beginning, in step 8, the pulse frequency of CPU 2 is checked by reading out CPU-internal configuration registers. In addition, by a comparison to data stored in the frequency-dependent program, it is determined whether the driving program stored on storage medium 4 is set up for the pulse frequency of CPU 2. The data relating to the pulse frequency is provided by ROM 3. If the program has been programmed incorrectly, i.e., the frequency stored in the frequency-dependent program does not match the frequency determined by the ROM, measures for reprogramming the program are initiated in step 9. For this purpose, the execution of the control program is terminated and the sequencing control returned to the ROM. The sequencing control in the ROM allows the frequency-dependent control program to be reprogrammed. If the reprogramming has ended, or if a correctly programmed program was available from the beginning, the program is executed in step 10.

The pulse frequency of CPU 2 (FIG. 1) may be rechecked once the program has been reprogrammed, or to check that the pulse frequency of the CPU and the expected frequency of the frequency-dependent program match, and only then begin with the execution of the program.

In accordance with the described method for starting the control device and for controlling and/or regulating operational sequences, particularly in a motor vehicle, these methods may be implemented if corresponding computer programs are stored on a storage medium or data medium and these are executed on a computer, particularly a control device.

The aforementioned storage means or data media with the corresponding computer program may be a hard disk, an EPROM, flash-EPROM etc., that is, an integrated storage means, but also a mobile storage medium, such as a diskette or a CD-ROM. In the process of carrying out the method according to the present invention, the respective computer program as it relates to the exemplary embodiment may be executed on control device 1, on the one hand, and on programming device 15, on the other hand. A combined execution on both (1 and 15) is possible as well.

The independence from the CPU-frequency of the frequency-independent part or the frequency-independent program may also be achieved using an additional embodiment by having the ability of adapting to a multitude, or all possible, CPU-pulse frequencies.

What is claimed is:

1. A control device for controlling operational sequences in a motor vehicle, comprising:
 a CPU having a predefined pulse frequency;
 a storage arrangement that includes at least one of a frequency-dependent program or data for controlling the operational sequences, wherein a frequency-independent program is provided therein to determine an expected pulse frequency from the frequency-dependent program or data, thereby allowing a comparison of the pulse frequency of the CPU and the expected pulse frequency, the frequency-independent program being able to initiate measures for reprogramming the frequency-dependent program or data.

2. The control device of claim 1, further comprising:
 an additional storage arrangement in which data relating to the pulse frequency of the CPU is stored.

3. The control device of claim 2, wherein the additional storage arrangement includes a ROM.

4. The control device of claim 1, wherein the frequency-independent program initiates the measures if it determines based on the comparison that the pulse frequency of the CPU and the expected pulse frequency do not match.

5. The control device of claim 1, wherein the comparison is performed before any attempt is made to execute of the frequency-dependent program or data.

6. A method for starting a control device for controlling operational sequences in a motor vehicle, the method comprising:
 determining a pulse frequency of a CPU, which has a predefined pulse frequency, using a routine of a frequency-independent program;
 checking whether a frequency-dependent program is programmed correctly based on a determined pulse frequency;
 initiating measures to re-program the frequency-dependent program for an incorrectly programmed program; and
 beginning execution of the frequency-dependent program for a correct program;
 wherein the control device includes the CPU and a storage arrangement that includes the frequency-dependent program or data for controlling the operational sequences, the frequency-independent program being provided therein to determine an expected pulse frequency from the frequency-dependent program or data, thereby allowing a comparison of the pulse frequency of the CPU and the expected pulse frequency, the frequency-independent program being able to initiate measures for reprogramming the frequency-dependent program or data.

7. The method of claim 6, further comprising:
executing the routine for determining the pulse frequency of the CPU to read in data from the storage medium in which data relating to the pulse frequency of the CPU is stored via a first interface between the frequency-dependent program and the storage arrangement.

8. The method of claim 7, wherein the storage arrangement includes a ROM.

9. The method of claim 7, further comprising:
outputting a resulting Boolean value and providing it to the frequency-dependent program via a second interface following a comparison of the pulse frequency of the CPU to an expected pulse frequency of the frequency-dependent program.

10. The method of claim 6, wherein the measures are initiated before any attempt is made to execute the frequency-dependent program.

11. A method for controlling operational sequences in a motor vehicle, the method comprising:
determining the pulse frequency of a CPU;
determining an expected pulse frequency of a frequency-dependent program using a frequency-independent program, wherein the frequency-dependent program is based on a CPU pulse frequency and is stored at a first storage arrangement;
comparing the expected pulse frequency and the pulse frequency of the CPU; and
implementing a reprogramming of the frequency-dependent program as a function of the comparing;
wherein the frequency-independent program is stored on one of the first storage arrangement and a second storage arrangement.

12. The method of claim 11, further comprising:
one of reading data relating to the pulse frequency of the CPU out from the second storage arrangement using the frequency-independent program, and determining the pulse frequency of the CPU using the frequency-independent program from the data relating to the pulse frequency of the CPU;
wherein the data relating to the pulse frequency of the CPU are stored on the second storage arrangement.

13. The method of claim 12, wherein the second storage arrangement includes a ROM.

14. The method of claim 11, further comprising:
determining based on the comparison whether the pulse frequency of the CPU and the expected pulse frequency match,
wherein the reprogramming is implemented by the frequency-independent program if it determines that the pulse frequency of the CPU and the expected pulse frequency do not match.

15. The method of claim 14, wherein the determining of whether the pulse frequency of the CPU and the expected pulse frequency match, and the reprogramming is performed before any attempt is made to execute the frequency-dependent program.

16. A computer-executable program at a storage medium for starting a control device including a CPU having a predefined pulse frequency, the program including instructions for execution by a computer for:
determining the pulse frequency of the CPU using a routine of a frequency-independent program;
checking whether a frequency-dependent program is programmed correctly based on a determined pulse frequency;
initiating measures to re-program the frequency-dependent program for an incorrect program; and
beginning execution of the frequency-dependent program for a correct program;
wherein the control device includes a storage arrangement that includes the frequency-dependent program or data for controlling operational sequences, the frequency-independent program being provided therein to determine an expected pulse frequency from the frequency-dependent program or data.

17. The computer-executable program of claim 16, wherein the frequency-independent program determines in the checking step whether the expected pulse frequency and the determined pulse frequency match, and initiates the measures if it determines that the expected pulse frequency and the determined pulse frequency do not match.

18. The computer-executable program of claim 16, wherein the measures are initiated before any attempt is made to execute the frequency-dependent program.

19. A computer-executable program at a storage medium for starting a control device including a CPU having a predefined pulse frequency, the program including instructions for execution by a computer for:
determining the pulse frequency of the CPU;
determining an expected pulse frequency of a frequency-dependent program using a frequency-independent program;
comparing the expected pulse frequency and the pulse frequency of the CPU; and
implementing a reprogramming of the frequency-dependent program as a function of the comparing;
wherein the frequency-independent program is stored on one of a first storage arrangement and a second storage arrangement;
wherein the control device includes the first storage arrangement, which includes the frequency-dependent program or data for controlling operational sequences, the frequency-independent program being provided therein to determine the expected pulse frequency from the frequency-dependent program or data.

20. The computer-executable program of claim 19, wherein the reprogramming is implemented by the frequency-independent program if it determines based on the comparing that the expected pulse frequency and the pulse frequency of the CPU do not match, and wherein the reprogramming is implemented before any attempt is made to execute the frequency-dependent program.

* * * * *